July 29, 1924.
C. A. ROUZER ET AL
1,503,247
REPAIR DEVICE FOR TRAIN PIPE HOSE
Filed March 23, 1922
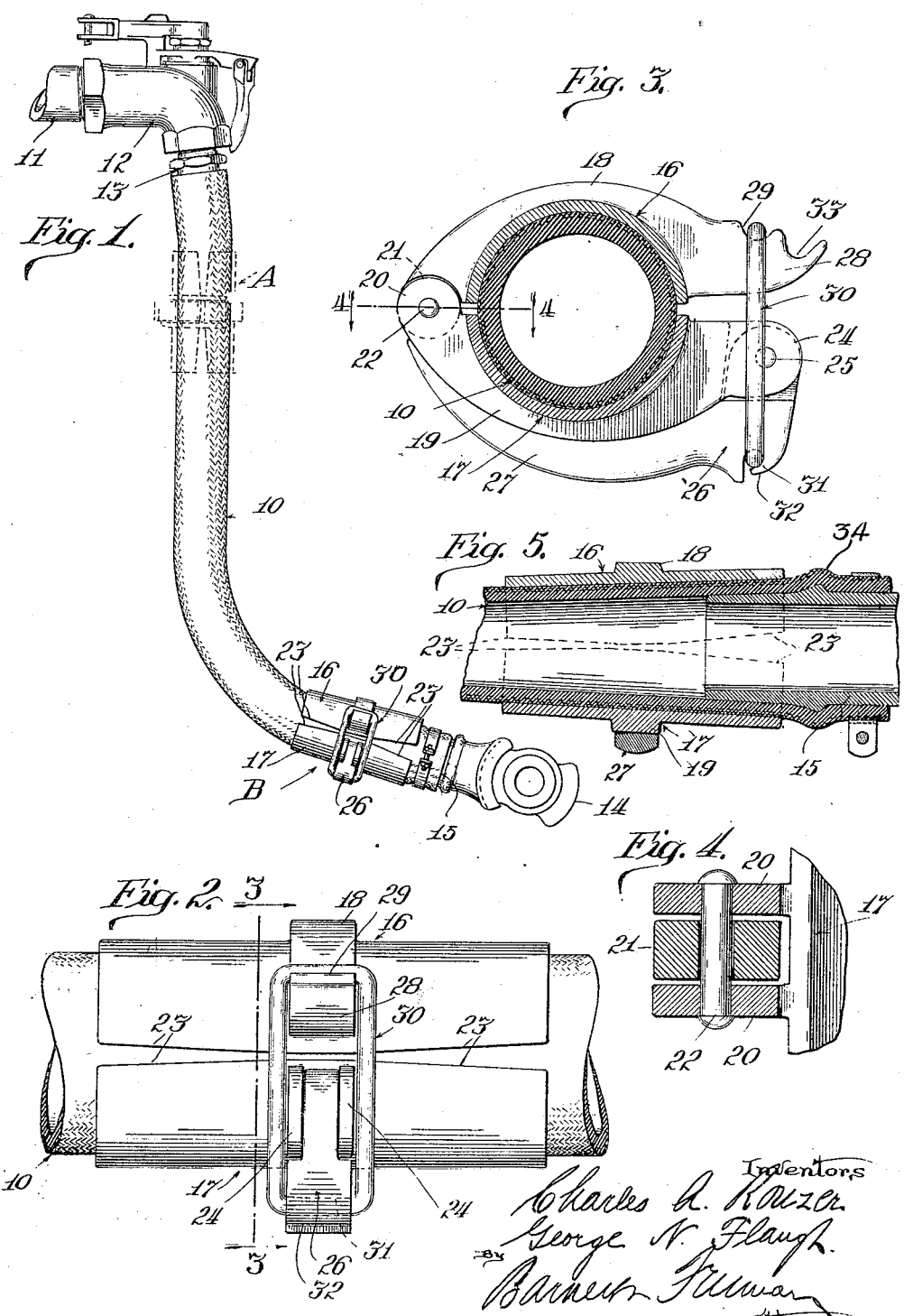

Patented July 29, 1924.

1,503,247

UNITED STATES PATENT OFFICE.

CHARLES A. ROUZER AND GEORGE N. FLAUGH, OF FORT WAYNE, INDIANA.

REPAIR DEVICE FOR TRAIN-PIPE HOSE.

Application filed March 23, 1922. Serial No. 545,919.

*To all whom it may concern:*

Be it known that we, CHARLES A. ROUZER and GEORGE N. FLAUGH, citizens of the United States, residing at Fort Wayne, in the county of Allen and State of Indiana, have invented certain new and useful Improvements in Repair Devices for Train-Pipe Hose, of which the following is a specification.

Our invention relates to a device for temporarily repairing the M. C. B. rubber hose used for connecting the air and steam train pipes on the adjacent cars of a railway train, and the invention has for its object to provide a simple and compact device that can be cheaply manufactured and conveniently applied to a bursted, torn or otherwise mutilated hose for repairing the same until such time as the damaged hose can be replaced; the invention contemplating particularly a device which, if necessary, will adjust itself to slightly bent or curved portions of the hose or to other irregularities in shape, for example, those produced at the places where the hose is attached to the coupler and angle cock nipples.

It happens not infrequently that the rubber hose used in connection with the air and steam train pipes on railway cars burst or become damaged so that they will not hold the pressure. Ordinarily a supply of new hose is carried on the locomotive or the hose are available at points along the line; but the replacement of a hose consumes some little time and delays from this cause are inconvenient and costly. As these hose are somewhat expensive the trainmen are supposed to turn in the damaged hose when a replacement is made, and the cost of the new hose should, of course, be charged to the railroad company owning the car on which the replacement is made, regardless of whether the train is operated by such company or by a foreign railroad company. However, through carelessness the trainmen often throw away the old hose and usually obtain the new hose from the locomotive hauling the train and frequently, in freight service at least, fail to report the replacement so that the road owning the car is not charged with the item as should be the case.

Our invention provides a device which can be used to repair the bursted or otherwise damaged hose until such time as the car reaches its destination, or for a longer time if thought desirable as the repair effected is a substantial one. The device may be very quickly applied to the hose without risk to the person making the application. By supplying the train crew with a few of these devices which are small, compact, and can be produced at a trifling expense, the delay incident to the bursting of a train pipe hose is reduced to an inappreciable minimum and the matter of accounting between the railroad company operating the train and the company owning the car is simplified, the latter because replacement of the hose may be postponed until the car is returned to the home road or reaches a repair shop for inspection and, if need be, other repairs.

The invention is illustrated, in a preferred embodiment, in the accompanying drawing wherein Fig. 1 shows, in side elevation, an air train pipe hose together with the coupler and the angle cock to which the hose is attached, the device of our invention being shown as applied to the hose.

Fig. 2 is a side elevation of the repair device shown in position on the hose.

Fig. 3 is a sectional view on line 3—3 of Fig. 2.

Fig. 4 is a sectional view on line 4—4 of Fig. 3, and

Fig. 5 is a fragmentary view to illustrate the deformation of one end of the hose incident to its attachment to the coupler nipple and the capacity of the repair device for adapting itself to this part of the hose.

Referring to the drawing, 10 designates a M. C. B. rubber hose as used in connection with the air train line, 11 designates the train pipe on one of the cars, 12 the angle or shut-off cock on the end of the train pipe, and 13 a nipple on the angle cock to which the upper end of hose 10 is secured. 14 is the coupler having a nipple 15 to which the lower end of the hose 10 is secured. The usual method of attachment of the hose to nipples 13 and 15 is illustrated in Fig. 5.

The temporary repair device of our invention comprises two approximately semi-cylindrical members 16, 17, the interior diameter of which is a trifle smaller, say one-sixteenth of an inch smaller, than the over all diameter of the hose to be repaired. The members 16, 17 are formed with centrally arranged ribs 18, 19, rib 18 being formed with a clevis 20 and rib 19 with a tongue 21 connected by a pintle rivet 22 so as to provide means for hinging together members 16 and 17. The parts of the hinge are loosely connected together so as to have quite a little play and the semi-cylindrical members are formed so that these members can rock one on the other in a direction transverse to the axis (pintle 22) of the hinge between said members so that the ends of said member may, if need be, be spread apart at one end of the device and brought closer together at the other end.

To allow this rocking movement the longitudinal edges of the members 16, 17, are slightly oblique, the edges of each member converging from the central web toward the ends as indicated at 23.

The members 16, 17 are clamped to the hose 10 in any suitable manner. We have shown the rib 19 as formed with a forked projection 24 to which is pivoted, by rivet 25, a lever 26 the handle portion 27 of which conforms to the exterior contour of rib 19 against which the lever lies when the device is applied to the hose. The other rib 18 is formed with a projection 28 having a notch 29 to receive a link 30, the other end of which is pivoted in a recess 31 formed in lever 26, this recess being closed sufficiently to hold the link in place by bending over a lug 32. The projection 28 is preferably formed with a second notch 33. With the link seated in notch 29 the lever is in locked relation with the rest of the device, the link having moved past the pivot point 25 of the lever.

The device may be applied to any point on the hose to cover the break caused by the bursting of the hose. Before applying it the pressure is shut off by closing the angle cocks. On return of the pressure the hose is pressed against the semi-cylindrical members 16, 17 so as to effectually stop the leak. For the purpose of illustration, the device is shown as applied to the hose at two places. The dotted lines at A indicate the application of the device to a relatively straight portion of the hose of uniform cross section throughout the length covered by the device. In the full lines at B the device is shown as applied to the hose near its lower end. Ordinarily the nipple, for example the coupler nipple 15, is slightly bulged as indicated at 34 in order to more effectually keep the hose from slipping off the nipple. This bulge of the nipple stretches and deforms the end of the hose. If the hose should become damaged so as to require repair near its end the two hinged members of the repair device may be spread at one end, due to the looseness or play in the hinge, the obliquity of the edges of said members permitting the other ends of the members to be brought closer together. A train line hose is constantly flexing due to the movements of the cars between which it is placed. By hinging the complementary parts of the repair device together, by a single loose hinge midway between their ends the presence of the device on the hose does not seriously interfere with the necessary flexing movements of the hose nor do such movements cause leakage as would be the case if two or more hinges were used or other hinging means of such character as to hold the members against rocking movement. The device has capacity for self adjustment on the hose which adds very considerably to its utility. The notch 33 is for the purpose of preliminarily compressing the hose in case it should be distended at the place of application to such an extent as to make it difficult to hook the link, in the first instance, into notch 29. The inner surfaces of the clamping members are smooth, by which we mean that they are not formed with ribs or beads but conform to the surface of the hose on which they bear.

We claim:

1. A device for temporarily repairing a railway car train line hose comprising, in combination, a pair of members having smooth substantially semi-cylindrical inner surfaces, a single, centrally arranged hinge connecting the members, said members and hinge formed so that the members may be spread apart at one end of the device and brought closer together at the other end, and means for holding said members in clamped relation upon a hose.

2. A device for temporarily repairing a railway car train line hose comprising, in combination, a pair of members having smooth substantially semi-cylindrical inner surfaces, a single, centrally arranged hinge connecting said members, the members being formed so that their adjacent edges diverge toward the ends of the device and the hinge providing a loose connection permitting the members to be spread apart at one end of the device and brought closer together at the other end, and means for clamping said members to the hose.

3. A device for temporarily repairing a railway car train line hose comprising, in combination, a pair of members having smooth substantially semi-cylindrical inner surfaces, a single, centrally arranged hinge connecting said members, said members and hinge being formed so that the members may be spread apart at one end of the device and brought closer together at the other end by a rocking movement at said hinge, and clamping means diametrically arranged with respect to the hinge for fastening the device to a hose while permitting said rocking movement.

4. In a device for temporarily mending a railway train line hose, the combination of a pair of members of greater length than width and formed with semi-cylindrical inner surfaces which are smooth and without projections, a single centrally arranged hinge connecting together adjacent edges of said members, and means for drawing the other edges of said members together around the hose to clamp the device thereon, said hinge being formed so that said members can rock one on the other allowing said members to be spread apart at one end of the device and brought closer together at the other end.

CHARLES A. ROUZER.
GEORGE N. FLAUGH.